United States Patent
Hoefer

(12) 
(10) Patent No.: US 7,060,899 B1
(45) Date of Patent: Jun. 13, 2006

(54) PRE-WIRING ASSEMBLY SYSTEM AND METHOD

(76) Inventor: Michael R. Hoefer, 19456 Mt. Meadow North, Hidden Valley Lake, CA (US) 95467

( * ) Notice: Subject to any disclaimer, the term of this patent is extended or adjusted under 35 U.S.C. 154(b) by 14 days.

(21) Appl. No.: 11/231,704

(22) Filed: Sep. 21, 2005

(51) Int. Cl.
*H02G 3/18* (2006.01)

(52) U.S. Cl. .............. 174/65 G; 174/65 R; 174/152 G; 174/135; 16/2.1; 248/56

(58) Field of Classification Search .............. 174/65 G, 174/135, 152 G, 65 R, 151, 153 G; 248/56; 16/2.1, 2.2

See application file for complete search history.

(56) References Cited

U.S. PATENT DOCUMENTS

| 6,278,060 B1 * | 8/2001 | Mori ........................ 174/65 G |
| 6,374,455 B1 * | 4/2002 | Regele et al. .................. 16/2.1 |
| 6,664,470 B1 * | 12/2003 | Nagamoto ................ 174/65 G |

* cited by examiner

Primary Examiner—Dhiru R. Patel
(74) Attorney, Agent, or Firm—Charles L. Thoeming

(57) ABSTRACT

A pre-wiring apparatus, system and method is useful to provide a quick, efficient, and inexpensive way to install low voltage wire, and the like, between an electrical box and terminal locations during building construction. The apparatus includes bracketing, wire grommets, Sheetrock® tools, corner brackets, weatherproof stubs, and related trim elements to systematically provide non-detectable terminals for finished surfaces on interior walls and ceilings, and exterior walls. The method includes installing the terminal apparatus, running wire to selected locations, and finishing the terminal.

18 Claims, 18 Drawing Sheets

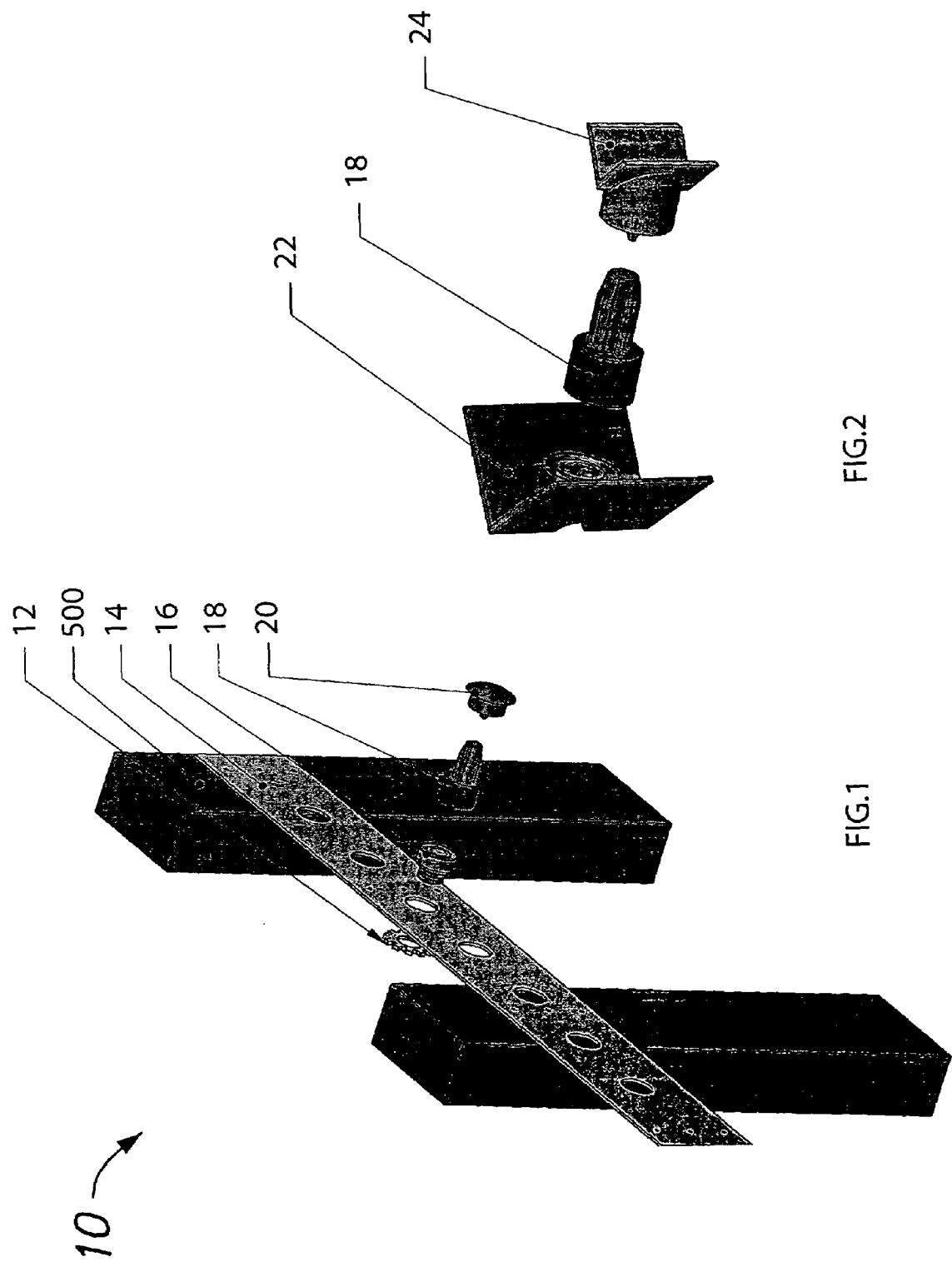

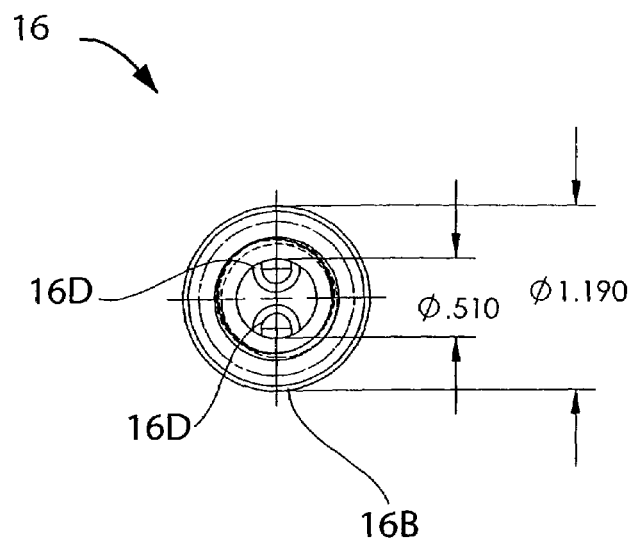
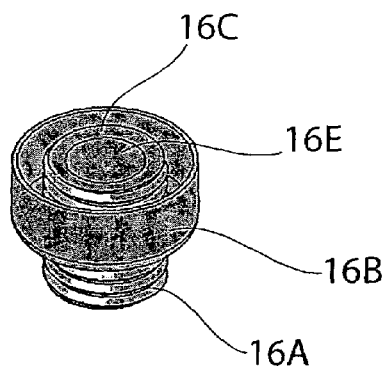
FIG.5
FIG.5A
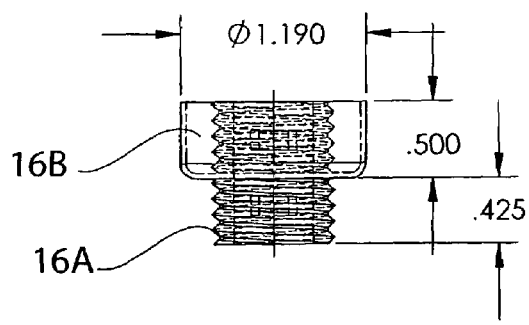
FIG.5B
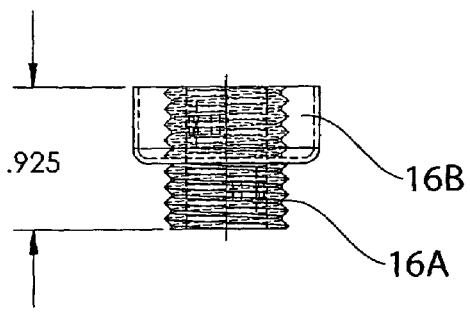
FIG.5C

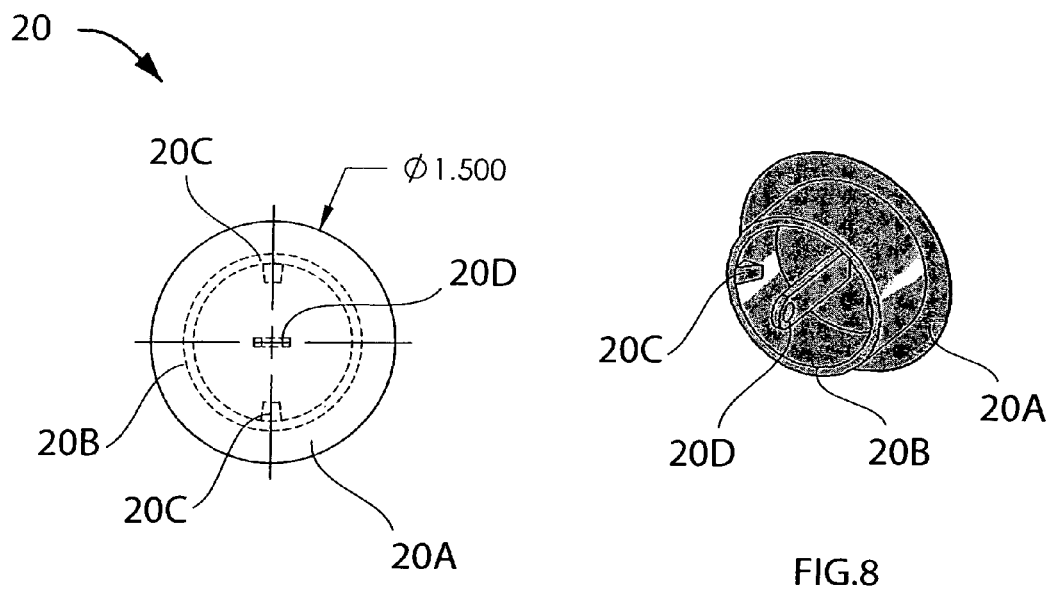
FIG.8A
FIG.8
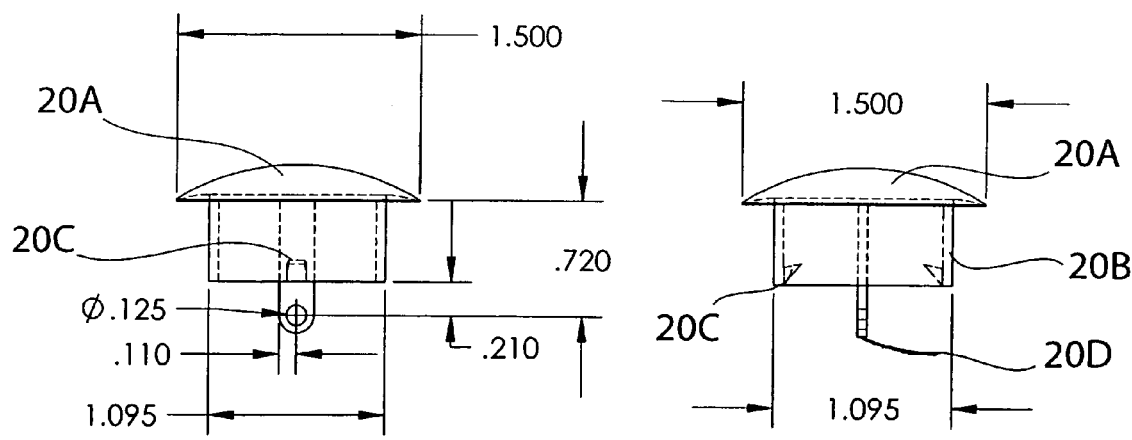
FIG.8B
FIG.8C

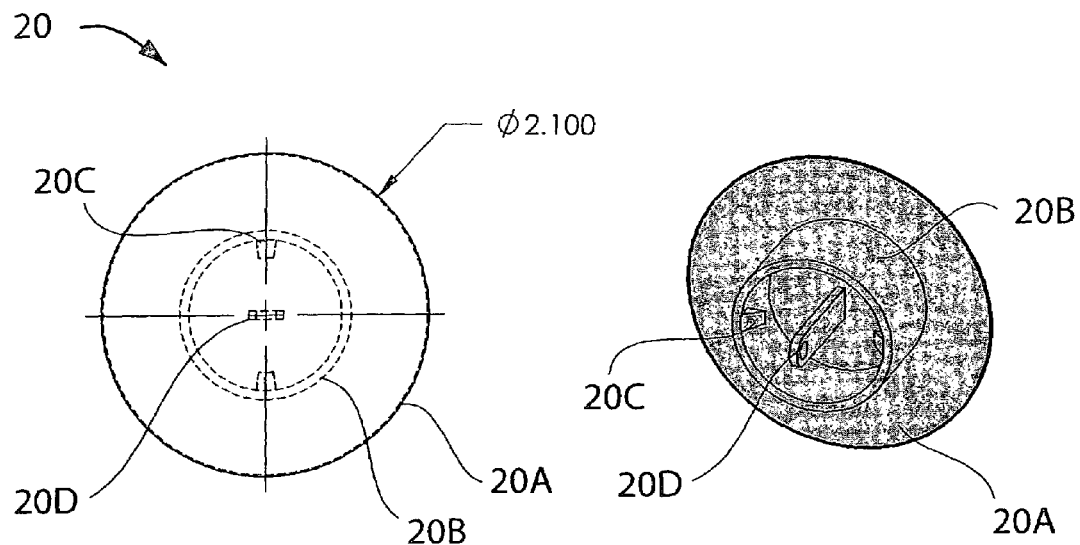
FIG.9A
FIG.9
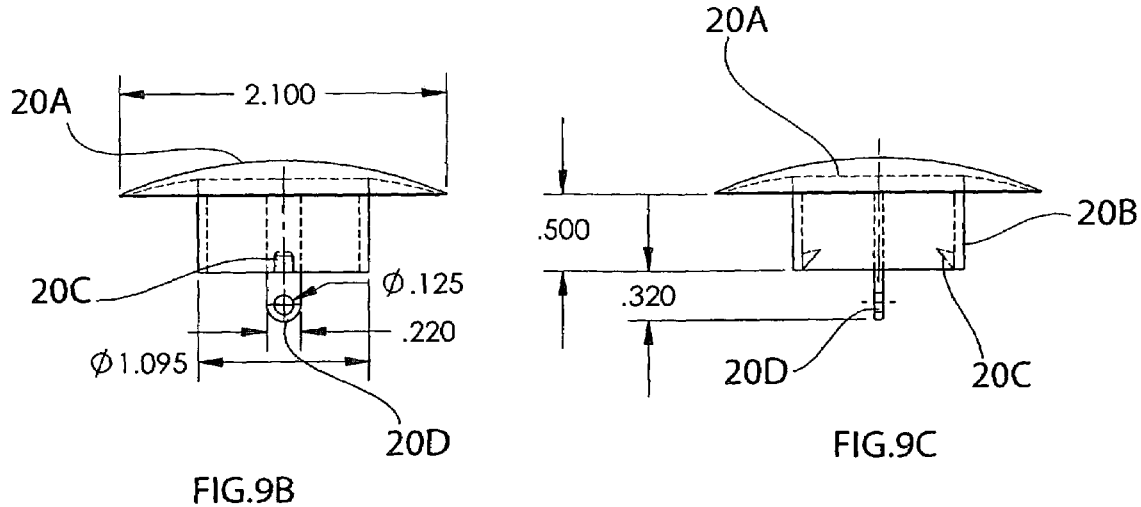
FIG.9B
FIG.9C

24

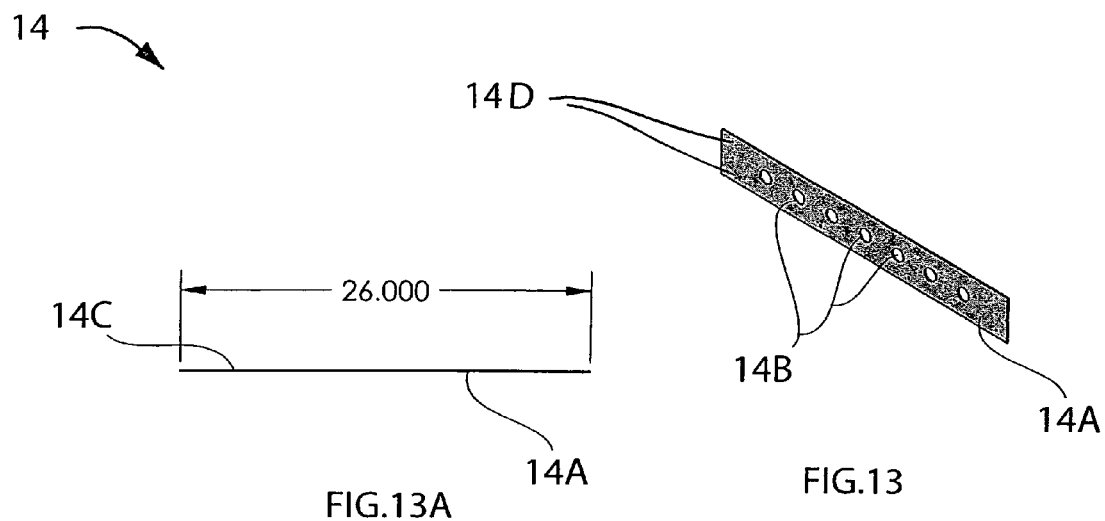
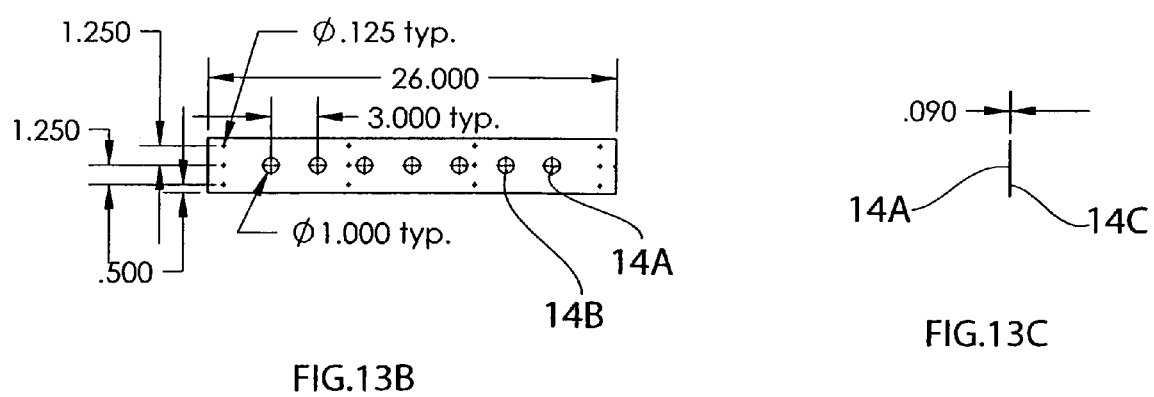

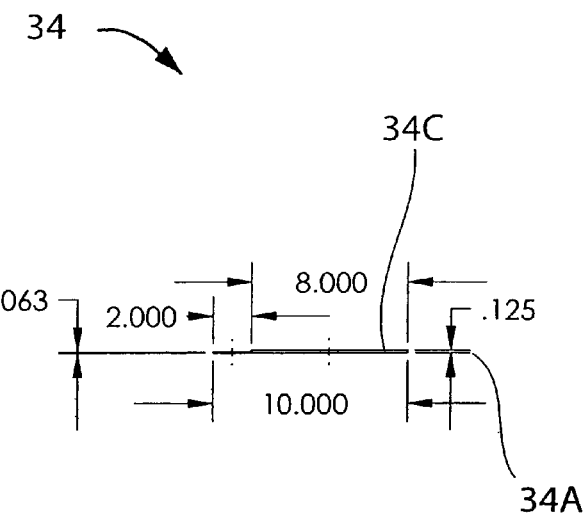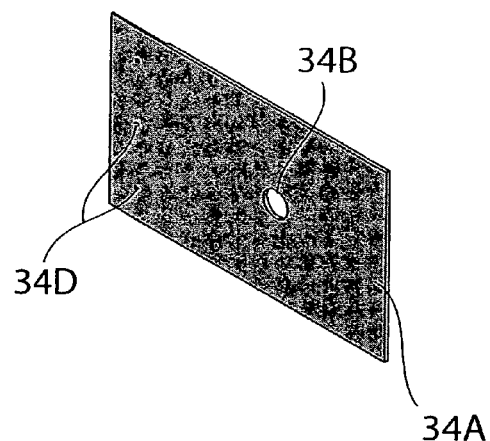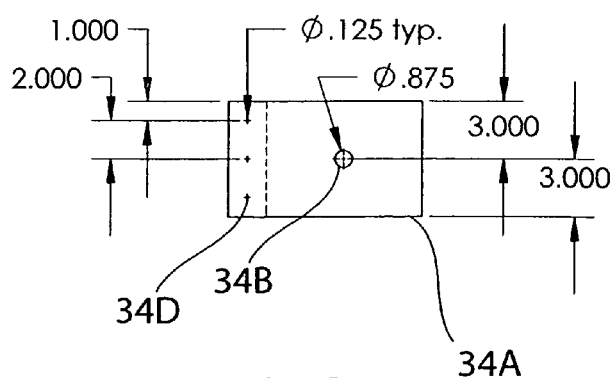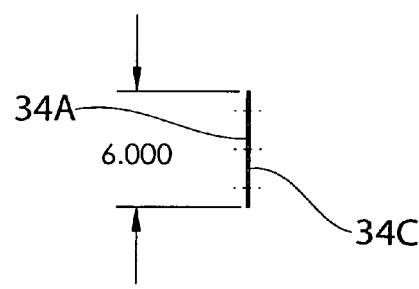
FIG.14A  FIG.14
FIG.14B  FIG.14C

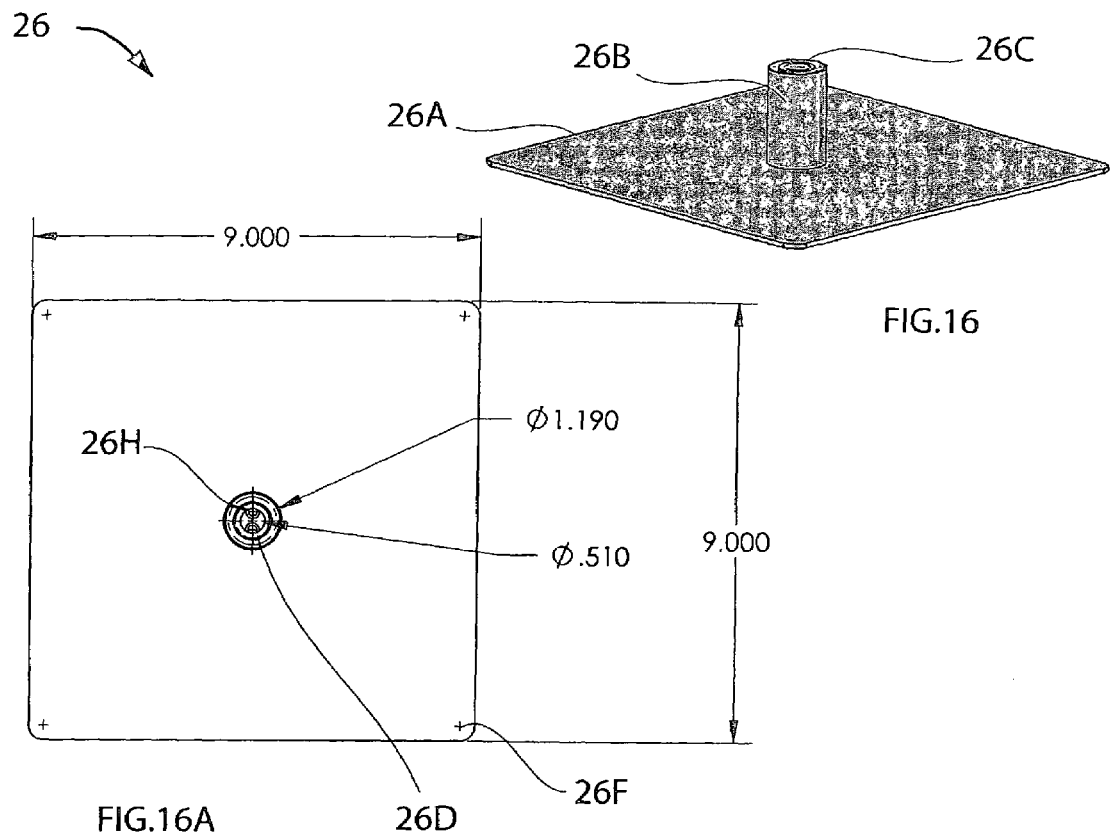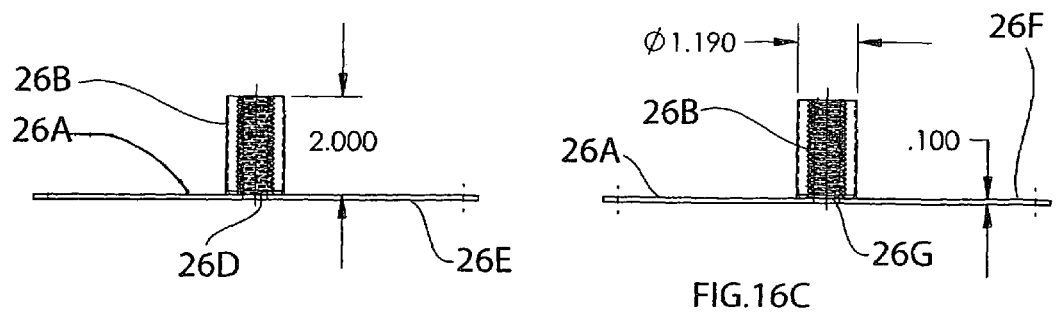

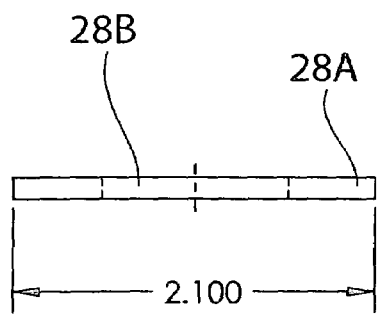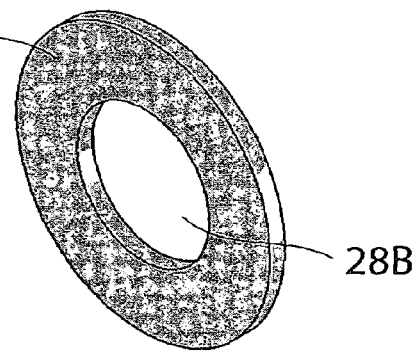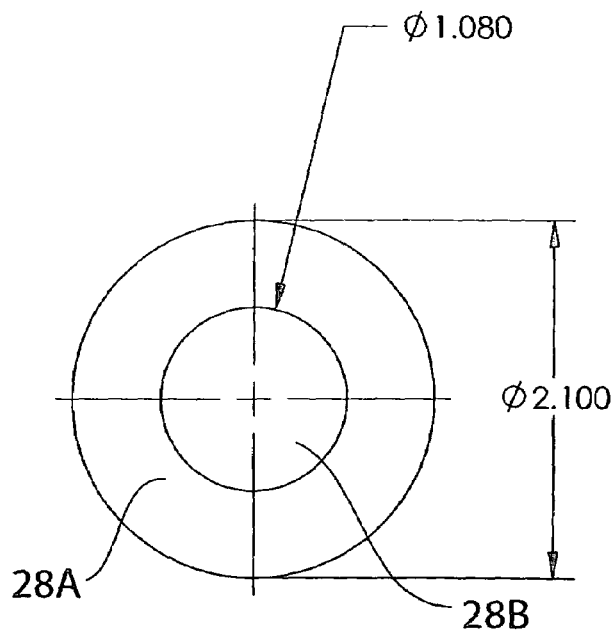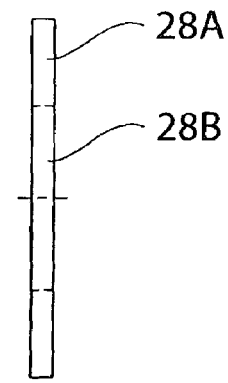
FIG.17A
FIG.17
FIG.17B
FIG.17C

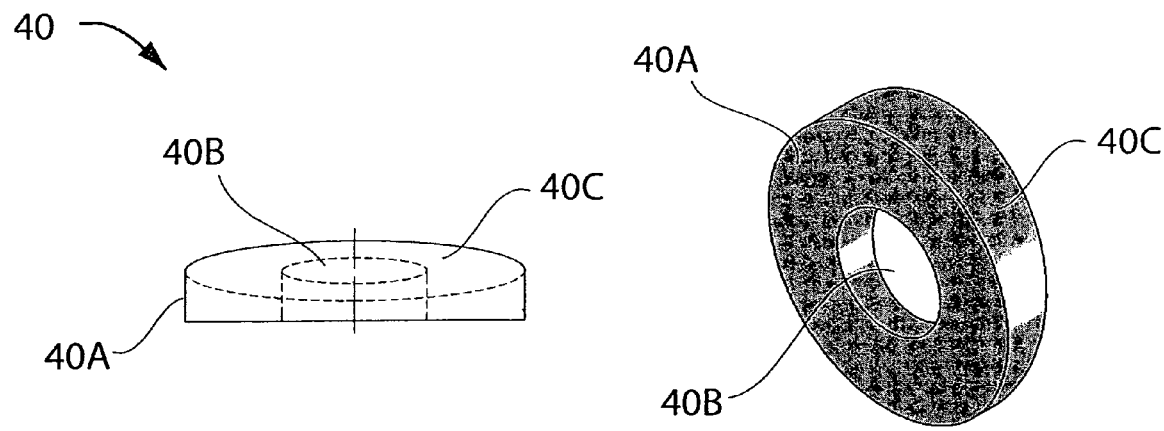
FIG.18A
FIG.18
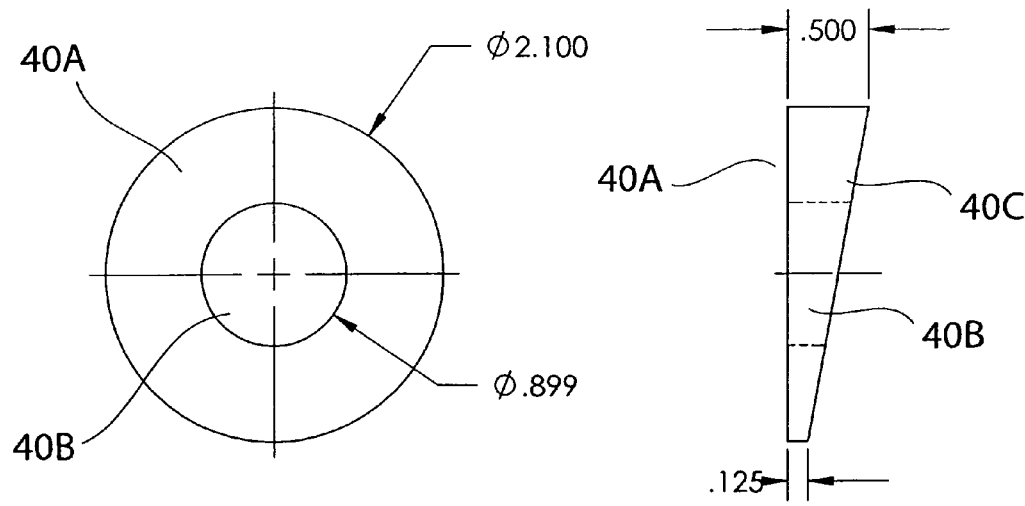
FIG.18B
FIG.18C

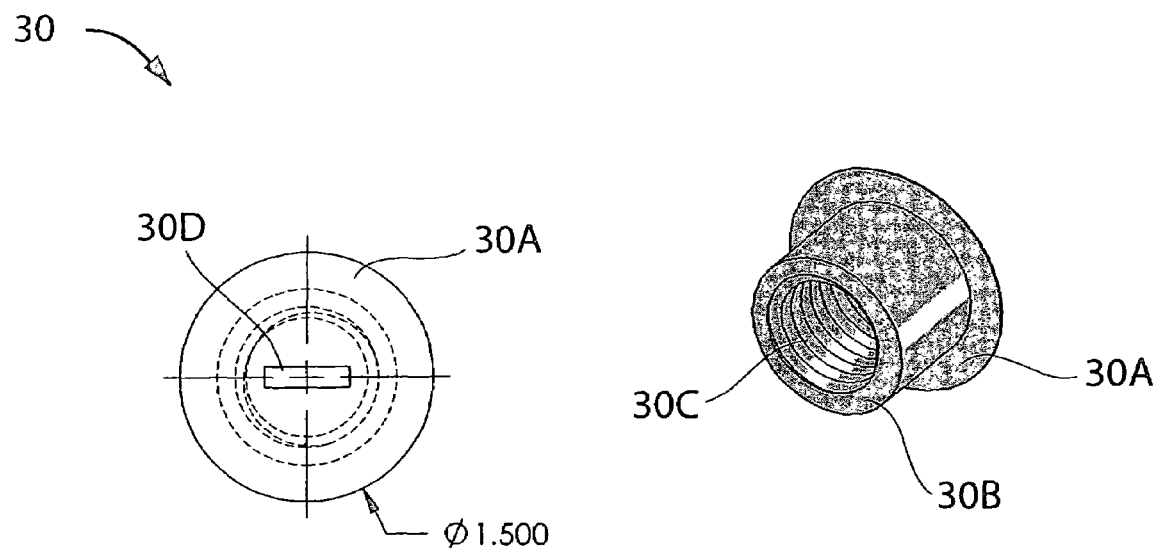
FIG.19A
FIG.19
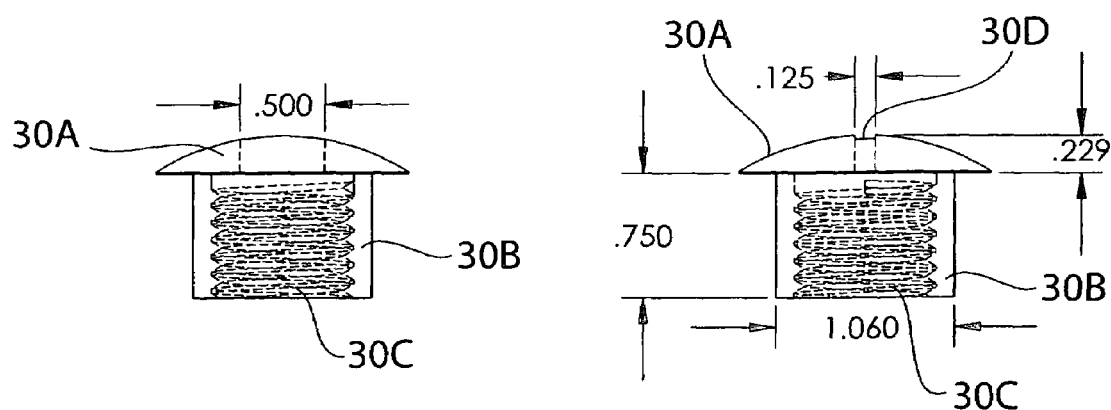
FIG.19B
FIG.19C

PRE-WIRING ASSEMBLY SYSTEM AND METHOD

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

Field of the Invention

This invention relates generally to pre-wiring installation systems, and in particular, to a universal low voltage pre-wiring system designed for applications including, but not limited to, residential alarm or smoke detection systems, home entertainment speaker and control systems, residential inter-communications systems, HVAC thermostats, residential security systems, surveillance systems, watering and drip irrigation systems, and the like.

BRIEF SUMMARY OF THE INVENTION

During construction of a dwelling or building, it is useful to install electrical wiring between outlet boxes, junction boxes, switches, fixtures, control devices, and the like by pre-wiring to actual or potential terminals after structural support members are in place. This pre-wiring process is made easier due to the fact that various wall portions are framed with internal structural elements and these structural elements are subsequently covered and finished with external surface elements. Designated terminal locations for such installed wiring can be easily mounted to the internal framing elements prior to completion of the external wall portion and suitable wiring interconnects and channels may be installed by extending the locations through the space designated for exterior or exterior wall finish. To the extent that such interconnects are components of a pre-wiring system, great flexibility in pre-wiring and finished wall wiring location is possible. When such components are modular in design, pre-wiring assembly is easy and inexpensive. Installed trim elements of pre-wiring systems can be painted over so the pre-wire terminal location blends into any wall or ceiling location.

It is, therefore, one object of this invention to provide a new and useful system, apparatus and method to allow the pre-wire routing of low voltage electrical pathways in a building during construction so that additional outlet boxes, junction boxes, switches, fixtures, and the like may be installed without compromising the integrity of the exterior surfaces of the walls containing such terminal locations.

A further object of the present invention is to provide a cost effective system, apparatus and method to allow the pre-wire routing of low voltage electrical pathways in a building during construction so that users obtain a professional quality installation.

It is yet another object of this invention to provide a universal system, apparatus and method to allow the pre-wire routing of electrical pathways applicable to all low voltage systems.

It is a further object of this invention to provide an inexpensive system, apparatus and method for pre-wire routing of low voltage electrical pathways.

It is yet a further object of this invention to provide a system, apparatus and method to eliminate the necessity of obvious wire location plates and make pre-wire locations undetectable on an interior finished wall surfaces.

Apparatus according to the present invention is thus adapted for pre-wiring a building during construction whereby electrical wire or the like may be drawn as an electrical interconnect between along a pathway between a first and second terminal locations in a wall portion of a building such that the terminal location on the finished wall portion is undetectable. In its broad form, this apparatus includes in combination a hanger, a grommet, a Sheetrock® tool and trim located in the finished wall portion. The grommet is secured by a lock nut on the inside portion of the apparatus between studs or rafters. Embodiments of the apparatus are suitable for corner locations, exterior surfaces, and angled surfaces where weatherproofing issues or geometric anomalies are presented.

In a preferred embodiment of the apparatus, system and method of the present invention, a hanger having at least one opening is installed between rafters or on a stud. A grommet having a continuous annular aperture comprising an inner surface of even diameter, a first threaded male open end, a second threaded male open end, and cylindrical flange of predetermined diameter attached midway thereto such that the flange end corresponds to, and is flush with, the end of the second threaded male open end, is provided. The grommet is installed into an appropriate hanger opening and secured to the hanger by a lock nut threaded onto the first threaded male open end on the rafter or stud side of the hanger. The wire is run to the grommet. The grommet second threaded male open end and flange extends from the finish side of the hanger. A Sheetrock® tool having a threaded female open end, correspondingly threaded to communicate with the grommet second threaded male open end, within a cylindrical flange of diameter slightly less than the grommet flange, and a tapered ribbed male open end, defining an interior passage through the tool of even diameter is provided. Once the Sheetrock® tool is threaded onto the grommet second threaded male open end, the wall is finished with drywall and textured. A trim having a cylindrical flange with open end of a diameter slightly larger than the grommet flange and locking mechanism within the trim cylindrical flange is provided. The Sheetrock® tool is then removed from the grommet and the trim is installed and locked onto the grommet flange.

Related features, objects and advantages of the present invention will be apparent with reference to the following description and accompanying drawings.

BRIEF DESCRIPTION OF DRAWINGS

FIG. 1 is an exploded perspective view of an embodiment of the present invention depicting, in combination, a wire grommet 16, a Sheetrock® tool 18, a regular trim 20, a stud hanger 14, a typical stud or rafter support 500, and a standard lock nut 12.

FIG. 2 is an exploded perspective view of the assembled elements of an embodiment of the present invention for a right angled corner system depicting, in combination, a corner bracket 22, a Sheetrock® tool 18, and corner trim 24.

FIG. 5 is a perspective view of a ½ inch wire grommet of an embodiment of the present invention FIG. 5A is a top view of a ½ inch wire grommet of an embodiment of the present invention.

FIG. 5B is a front elevational view of FIG. 5A.

FIG. 5C is a right side elevational view of FIG. 5B.

FIG. 8 is a perspective view of a regular trim of an embodiment of the present invention.

FIG. 8A is a top view of a regular trim of an embodiment of the present invention.

FIG. 8B is a front elevational view of FIG. 8A.

FIG. 8C is a right side elevational view of FIG. 8B.

FIG. 9 is a perspective view of an oversize trim of an embodiment of the present invention.

FIG. 9A is a top view of an oversize trim of an embodiment of the present invention.

FIG. 9B is a front elevational view of FIG. 9A.

FIG. 9C is a right side elevational view of FIG. 9B.

FIG. 13 is a perspective view of a rafter bracket of an embodiment of the present invention.

FIG. 13A is a top view of a rafter bracket of an embodiment of the present invention.

FIG. 13B is a front elevational view of FIG. 13A.

FIG. 13C is a right side elevational view of FIG. 13B.

FIG. 14 is a perspective view of a stud bracket of an embodiment of the present invention.

FIG. 14A is a top view of a stud bracket of an embodiment of the present invention.

FIG. 14B is a front elevational view of FIG. 14A.

FIG. 14C is a right side elevational view of FIG. 14B.

FIG. 16 is a perspective view of a weather proof flashing stub of an embodiment of the present invention.

FIG. 16A is a top view of a weather proof flashing stub of an embodiment of the present invention.

FIG. 16B is a front elevational view of FIG. 16A.

FIG. 16C is a right side elevational view of FIG. 16B.

FIG. 17 is a perspective view of a weather proof gasket of an embodiment of the present invention.

FIG. 17A is a top view of a weather proof gasket of an embodiment of the present invention.

FIG. 17B is a front elevational view of FIG. 17A.

FIG. 17C is a right side elevational view of FIG. 17B.

FIG. 18 is a perspective view of a weather proof slope gasket of an embodiment of the present invention.

FIG. 18A is a top view of a weather proof slope gasket of an embodiment of the present invention.

FIG. 18B is a front elevational view of FIG. 18A.

FIG. 18C is a right side elevational view of FIG. 18B.

FIG. 19 is a perspective view of a weather proof trim of an embodiment of the present invention.

FIG. 19A is a top view of a weather proof trim of an embodiment of the present invention.

FIG. 19B is a front elevational view of FIG. 19A.

FIG. 19C is a right side elevational view of FIG. 19B.

DETAILED DESCRIPTION OF THE INVENTION

1. Typical Interior Wall Pre-Wiring

Figure 3:
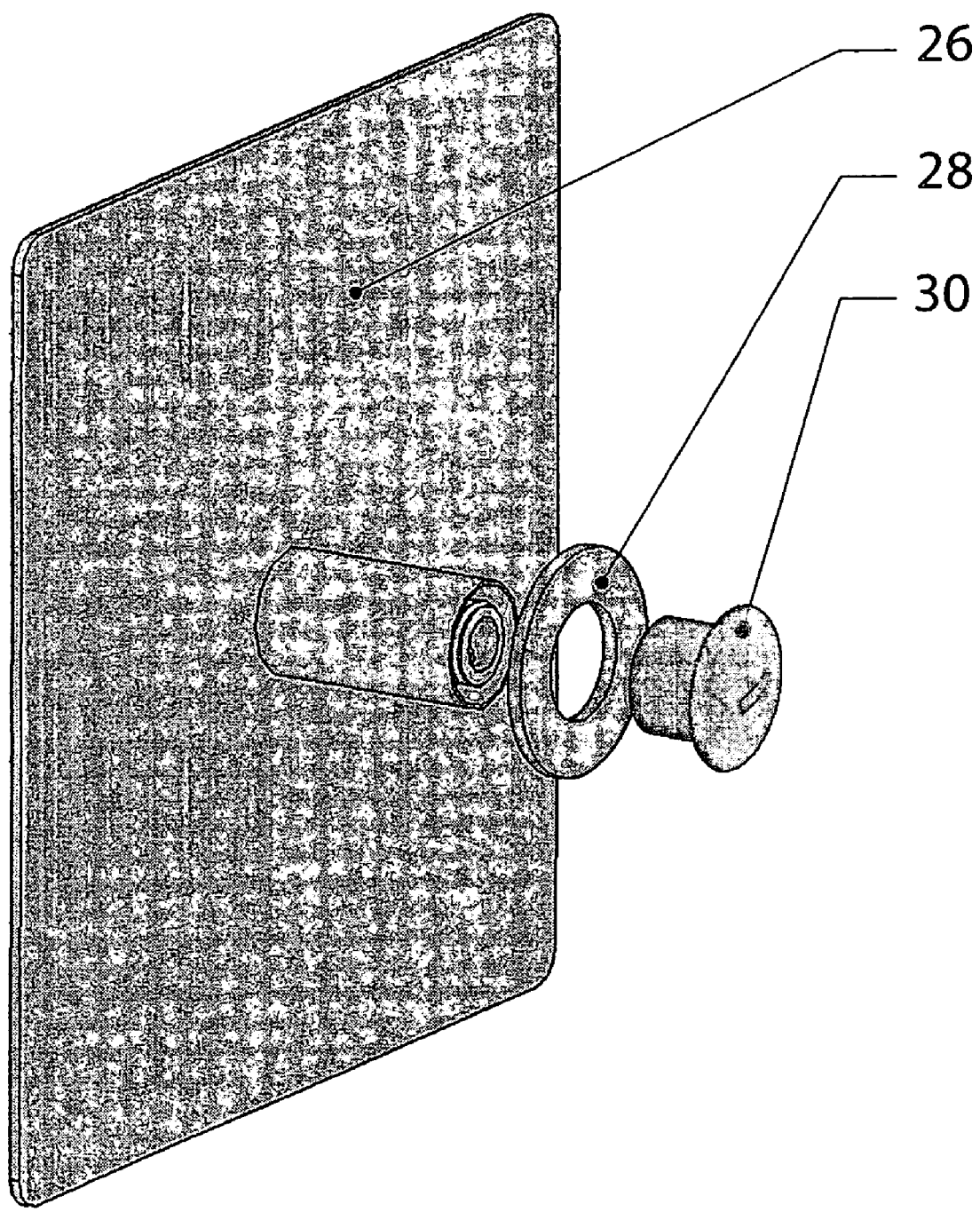
FIG. 3 is an exploded perspective view of the assembled elements of an embodiment of the present invention for weather proof assembly depicting, in combination, weatherproof flashing 26, gasket 28, and weatherproof trim 30.

With reference the drawings, the present invention 10 for pre-wiring low voltage wire terminal locations for unfinished surfaces generally comprises at least one support apparatus (14 or 34) or corner bracket (22) suitable to be affixed to an internal support structure (500) comprising at least one aperture (14B or 34B) of predetermined diameter. At least one wire grommet (16) sized to fit within the support apparatus aperture (14B or 34B) diameter or corner bracket (22) or weatherproof flashing stub (26) at an actual or potential terminal location is provided. Fastening means (1) (lock nut 12 and first threaded male open end 16A), or (2)(predetermined angle 22A) or (3)(plate base top side 26A, base bottom side 26E, and attachment holes 26F) are additionally provided to secure respectively (1) the wire grommet (16) to the support apparatus (14 or 34), or (2) the corner bracket 22 to the corner location, or (3) the weatherproof flashing stub 26 to the unfinished wall. The wire grommet (16), corner bracket (22), or weatherproof flashing stub (26) is protected from surface finishing by prophylactic means (Sheetrock tool® 18 and second threaded male open end 16C, or threaded male open end 22F, or weatherproof flashing stub flange 26B). Connecting means (clip stick 32, clip 32A, arm 32B, and connecting loop 32C) secures a wire connected to the wire grommet (16), corner bracket (22), or weatherproof flashing stub (26) to a box (501). At least one trim (20, 24, or 30) is sized to fit the wire grommet (16), corner bracket (22), or weatherproof flashing stub (26), respectively.

With reference to the drawings, an embodiment of the present invention 10 includes a grommet 16 comprising a continuous annular aperture defining an inner surface of even diameter 16E and a longitudinal centerline. The grommet further comprises a threaded outer surface and a cylindrical flange attached near a center point of the grommet threaded outer surface providing first and second threaded male open ends, 16A and 16C, whereby the flange 16B further comprises an open end corresponding in length to the second threaded male open end 16C, and terminating is a flush relationship thereto. The cylindrical flange 16B length can vary depending upon installation system requirements. Embodiments of the grommet 16 provide flange 16B lengths of ½ inch, ⅝ inch and 2 inches. The grommet 16 further comprises at least two off-set wire channels 16D within the annular aperture and affixed to the inner surface 16E.

The grommet 16 is installed into an appropriate rafter or stud hanger/bracket opening 14B or 34B and secured to the rafter or stud hanger/bracket 14 or 34 by a lock nut 12 threaded onto the grommet first threaded male open end 16A on the rafter or stud side of the hanger/bracket. Wire is run to the grommet first threaded male open end 16A and into and through the wire channels 16D within the annular aperture. The grommet second threaded male open end 16C and flange 16B extend from the finish side of the hanger/bracket. As can be discerned from the drawing figures, it is necessary for the diameter of the grommet first threaded male open end 16A to be slightly smaller than the diameter of the appropriate rafter or stud hanger/bracket opening 14B or 34B.

A Sheetrock® tool 18 is provided having a threaded female open end 18A which is correspondingly threaded to communicate with the grommet second threaded male open end 16C. The threaded female open end 18A is located within a cylindrical flange 18B of diameter slightly less than the grommet flange 16B, and a tapered ribbed male open end 18C, defining an annular aperture comprising an inner surface of even diameter 18D and a longitudinal centerline.

Once the Sheetrock® tool 18 is threaded onto the grommet second threaded male open end 16C, drywall is installed and the wall is textured or otherwise finished.

A trim 20, having a cylindrical flange 20B defining a longitudinal centerline with an open end diameter slightly larger than the grommet flange 16B and locking mechanism 20C within the trim cylindrical flange 20B, is provided. The locking mechanism 20C detachably connects trim cylindrical flange 20B disposed in opposition to grommet flange 16B and in pressing engagement with one another. The trim 20 further comprises a cap 20A having a circular planar surface of a diameter slightly larger than the cylindrical flange 20B attached to the flange 20B end opposite the open end, and an arcuate surface. A connecting prong 20D of predetermined length extends along the longitudinal axis from the cap 20A beyond the flange 20B open end.

Once the wall has been finished according to the construction plans and specifications, the Sheetrock® tool 18 is then removed from the grommet 16. Wire is extended from the wire channels 16D within the grommet annular aperture and affixed to the connecting prong 20D. The trim 20 is then installed and locked onto the grommet flange 16B using the locking mechanism 20C.

Figure 12A:
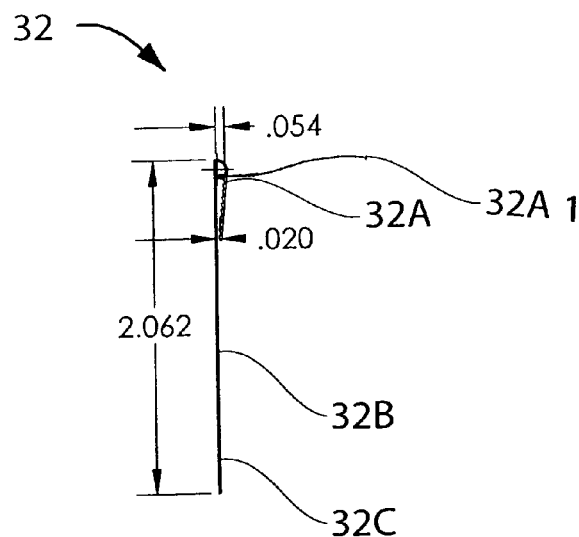
FIG. 12A is a top view of a clip stick element an embodiment of the present invention.
Figure 12:
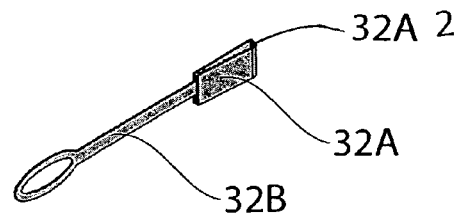
FIG. 12 is a perspective view of a clip stick of an embodiment of the present invention.
Figure 12B:
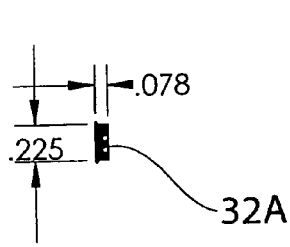
FIG. 12B is a front elevational view of FIG. 12A.
Figure 12C:
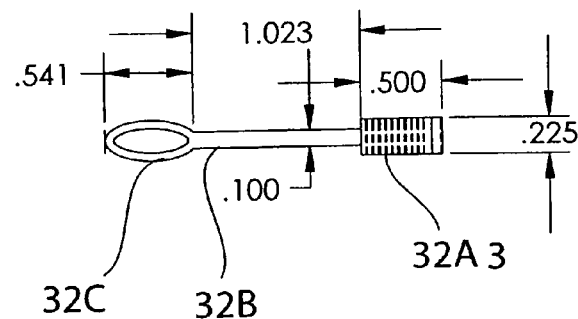
FIG. 12C is a right side elevational view of FIG. 12B.

The end of the wire not run through the grommet 16 and affixed to the trim prong 20D is attached to a connecting loop 32C of a clip stick 32. The connecting loop is attached to an arm 32B connected to a clip 32A. The preferred embodiment of the clip stick 32 of the present invention comprises an arm 32B having two ends. One arm end comprises an oval connecting loop 32C. The other arm end comprises a clip assembly 32A. The clip assembly 32A of the preferred embodiment of the present invention further comprises a receiving channel 32A1, a resilient head 32A2, and a plurality of teeth 32A3 on the inside head surface facing the channel 32A1, FIGS. 12–12C. Once the wire from the trim 20 is attached to the loop 32C, the receiving channel 32A1 is affixed to a electrical terminal box 501, FIG. 4, whereby the clip stick is held in fixed position thereto by the teeth 32A3 of the resilient head 32A2 until the low voltage system is ready to be installed and activated.

Implementation of the apparatus 10, system and method according to the present invention for unfinished interior walls is shown in FIG. 1. In FIG. 1, framing studs or rafters 500 for a building are shown. A stud hanger/bracket 34 or rafter hanger/bracket 14, FIGS. 13–13C, 14–14C respectively, is installed to the stud or rafter by standard screws or nails through a plurality of pre-measured and spaced openings, 14D or 34D, respectively, in an actual or potential terminal location. The rafter hanger/bracket 14 has a front side 14A and a back side 14C. The stud hanger/bracket 34 has a front side 34A and a back side 34C. A grommet 16 is installed into an aperture 14B of the hanger/bracket 14, FIGS. 1 and 13, and secured by a lock nut 13 in a position extending from the studs into the room to be finished. Wire, such as Cat 5, is run from the wire channels 16D of the wire grommet 16, FIGS. 1 and 5A, to a clip stick 32 which is then attached to a desired outlet box 501, FIG. 4. The Sheetrock® tool 18 is installed onto the wire grommet 16. Drywall and texture are added to the wall interior. The Sheetrock® tool 18 is removed from the wire grommet 16, and the trim 20 is installed onto the grommet. The wall and trim are painted according to the construction specifications.

2. Typical Corner Pre-Wiring

With reference to the drawings, an embodiment of the present invention provides a corner bracket 22 comprising a bracket member of predetermined angle 22A having an annular aperture 22E of predetermined diameter centered on the bracket angle. A grommet having a continuous annular aperture comprising an inner surface of even diameter 22G corresponding to the diameter of the annular aperture 22E, a longitudinal centerline, a threaded male open end 22F, and cylindrical flange 22B of predetermined diameter and length attached midway thereto and having an open end such that the flange open end corresponds to the end of the threaded male open end 22F, and terminates in a flush relationship thereto, is provided. The cylindrical flange 22B is affixed to the bracket member 22A so that flange length varies depending upon installation system requirements and predetermined bracket member angle. A preferred embodiment of the corner bracket 22 provides a right angled bracket member 22A. The corner bracket 22 further comprises at least two off-set wire channels 22D within the annular aperture 22E and affixed to the inner surface 22G.

A corner trim 24 is provided having a cylindrical flange 24B defining a longitudinal centerline with an open end of a diameter slightly larger than the corner bracket flange 22B and locking mechanism 24C within the trim cylindrical flange 24B, is provided. The cylindrical flange 24B is affixed to an angled member 24A so that flange length varies depending upon installation system requirements and predetermined angle. A preferred embodiment of the corner trim provides a right angled member 24A. The preferred embodiment of the corner trim 24 comprises at least two locking mechanisms 24C within the trim cylindrical flange 24B. A connecting prong 24D of predetermined length extends along the longitudinal axis from the angle member 24A beyond the flange 24B open end.

The corner bracket 22 is installed into the desired corner location support by conventional means according to the specifications of the construction project. An opening through the corner support and corresponding to the annular aperture 22E is provided. Wire is run to annular aperture 22E and into and through the wire channels 22D within the annular aperture 22E. The corner bracket 22 threaded male open end 22F and flange 22B extend from the finish side of the corner support.

A Sheetrock® tool 18 is provided having a threaded female open end 18A which is correspondingly threaded to communicate with the corner bracket 22 threaded male open end 22F. The Sheetrock® tool further comprises a threaded female open end 18A located within a cylindrical flange 18B of diameter slightly less than the corner bracket flange 22B, and a tapered ribbed male open end 18C, defining an annular aperture comprising an inner surface of even diameter 18D and a longitudinal centerline.

Once the Sheetrock® tool 18 is threaded onto the threaded male open end 22F, drywall is applied to the corner, and the location is textured or otherwise finished.

Once the corner location has been finished according to the construction plans and specifications, the Sheetrock® tool 18 is then removed from the corner bracket 22. Wire is extended from the wire channels 22D within the corner bracket annular aperture 22E and affixed to the connecting prong 24D. The corner trim 24 is then installed and locked onto the corner bracket flange 22B using the locking mechanism 24C.

Figure 4:
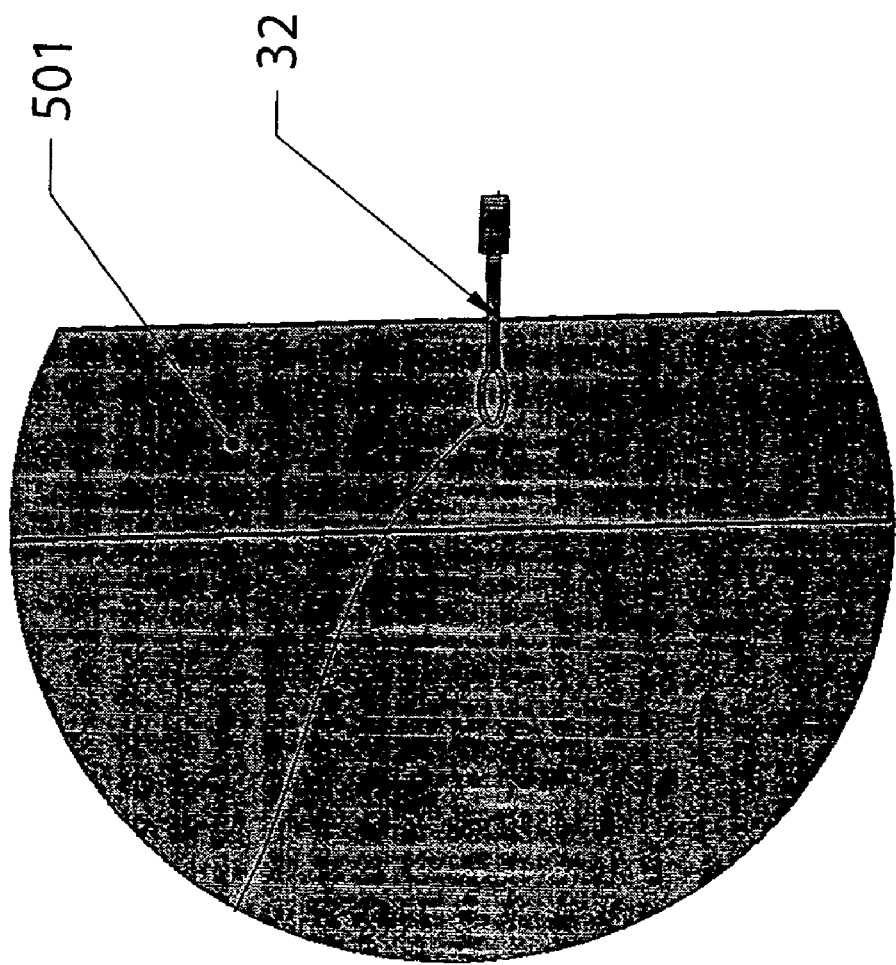
FIG. 4 is a perspective view of an embodiment of the present invention depicting a clip stick 32 and electrical box 501.
Figure 6A:
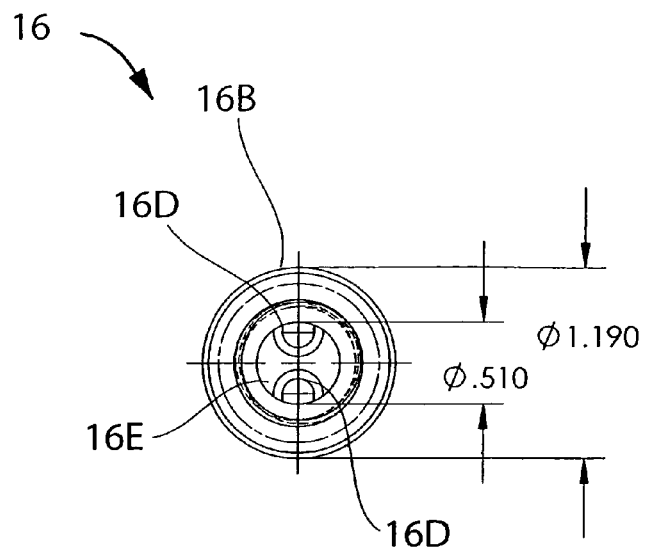
FIG. 6A is a top view of a ⅝ inch wire grommet of an embodiment of the present invention.
Figure 6:
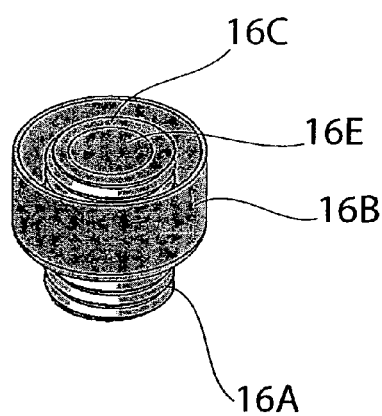
FIG. 6 is a perspective view of a ⅝ inch wire grommet of an embodiment of the present invention.
Figure 6B:
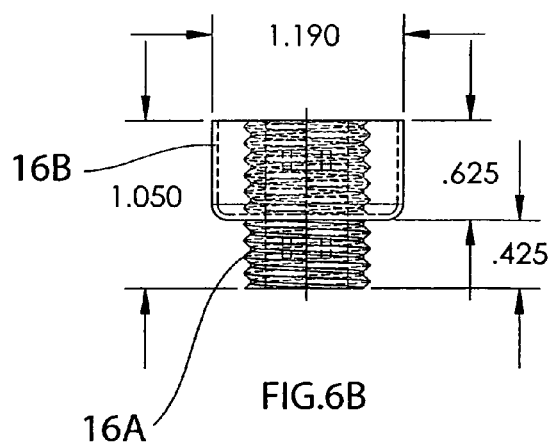
FIG. 6B is a front elevational view of FIG. 6A.
Figure 6C:
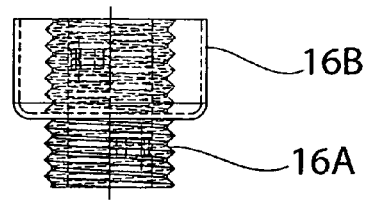
FIG. 6C is a right side elevational view of FIG. 6B.
Figure 7A:
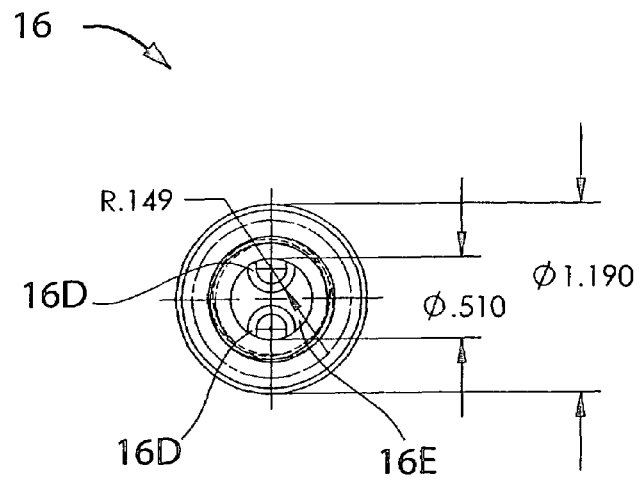
FIG. 7A is a top view of a 2 inch wire grommet of an embodiment of the present invention.
Figure 7:
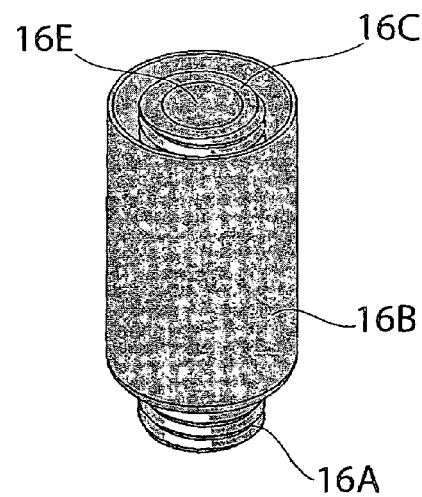
FIG. 7 is a perspective view of a 2 inch wire grommet of an embodiment of the present invention.
Figure 7B:
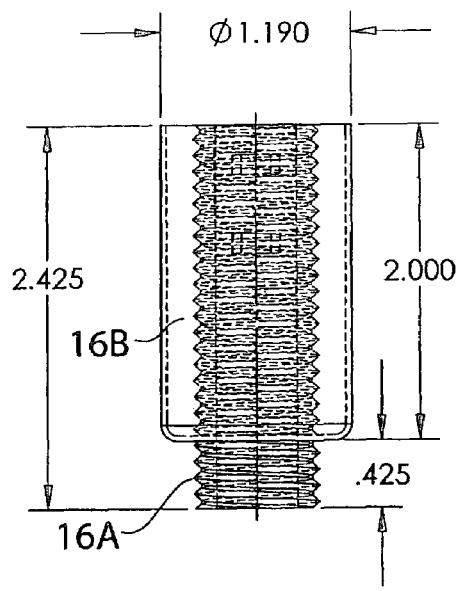
FIG. 7B is a front elevational view of FIG. 7A.
Figure 7C:
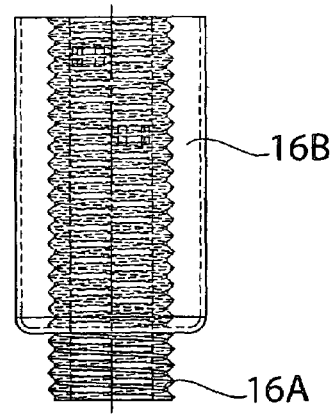
FIG. 7C is a right side elevational view of FIG. 7B.
Figure 10:
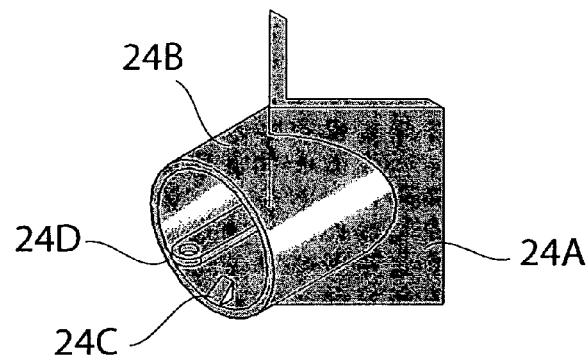
FIG. 10 is a perspective view of a right angled corner trim of an embodiment of the present invention.
Figure 10A:
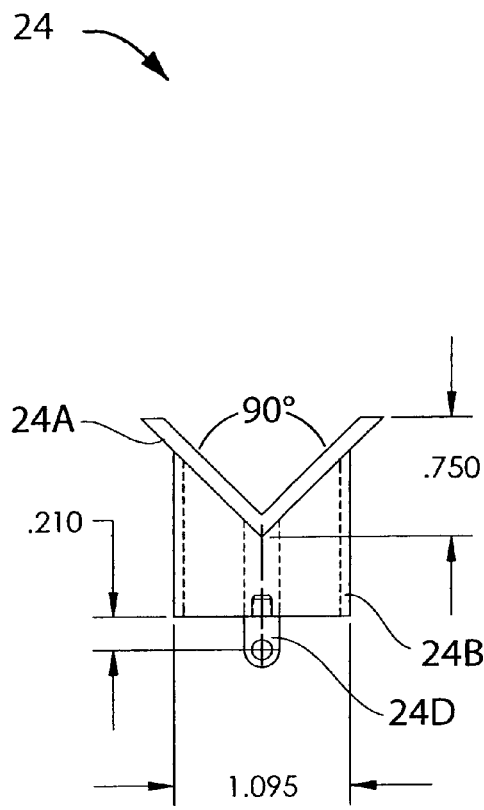
FIG. 10A is a top view of a right angled corner trim of an embodiment of the present invention.
Figure 10B:
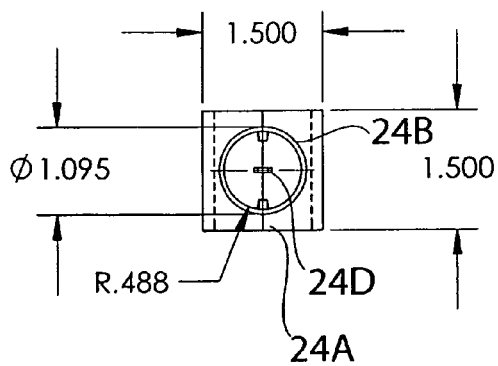
FIG. 10B is a front elevational view of FIG. 10A.
Figure 10C:
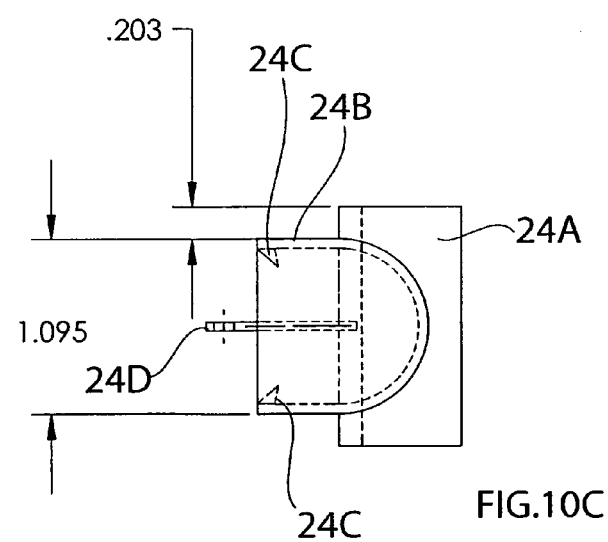
FIG. 10C is a right side elevational view of FIG. 10B.
Figure 11A:
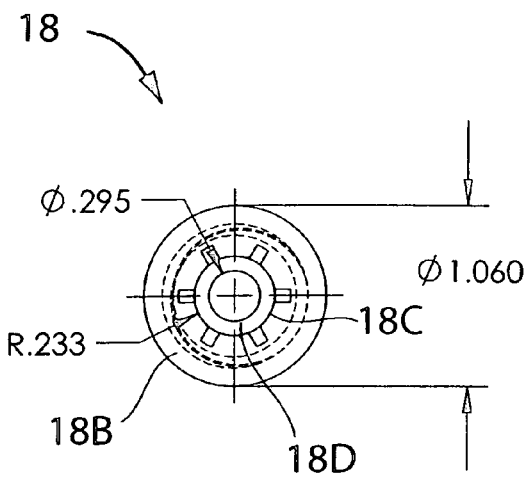
FIG. 11A is a top view of a Sheetrock® tool of an embodiment of the present invention.
Figure 11:
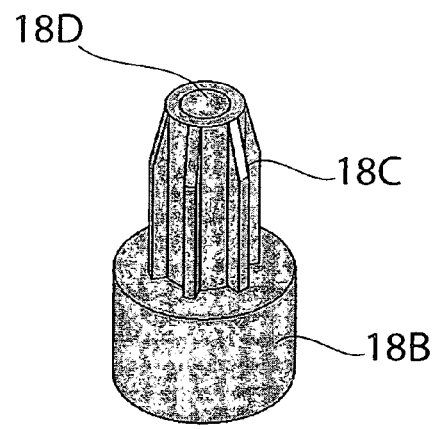
FIG. 11 is a perspective view of a Sheetrock tool of an embodiment of the present invention.
Figure 11B:
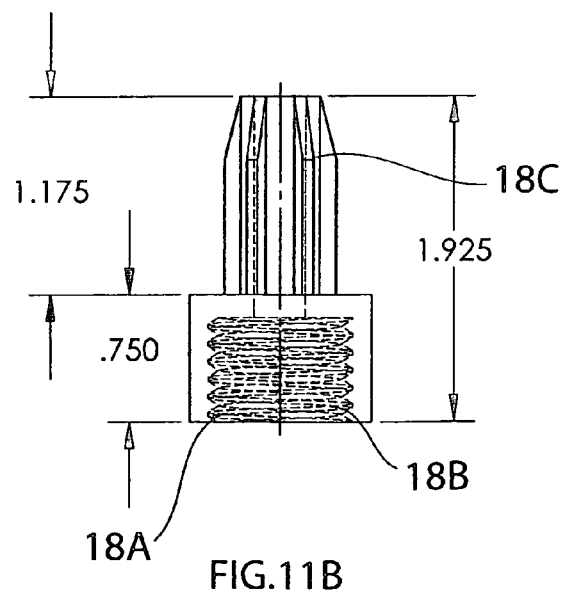
FIG. 11B is a front elevational view of FIG. 11A.
Figure 11C:
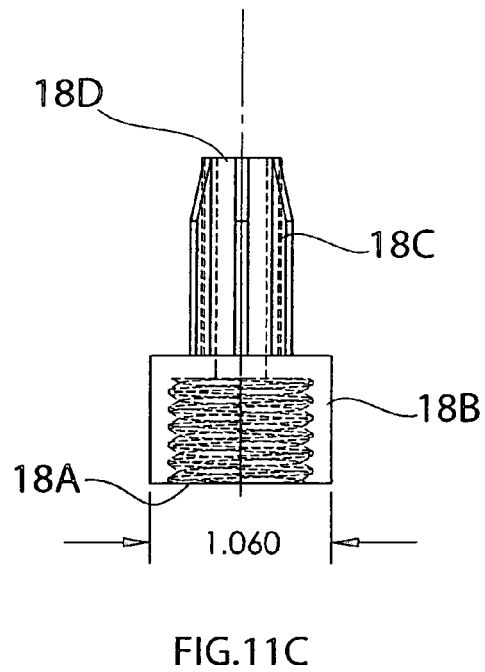
FIG. 11C is a right side elevational view of FIG. 11B.

The end of the wire not run through corner bracket annular apertures 22E and wire channels 22D and affixed to the corner trim prong 24D is attached to a connecting loop 32C of a clip stick 32 affixed to a electrical terminal box 501, FIG. 4, until the low voltage system is ready to be installed and activated.

Figure 15A:
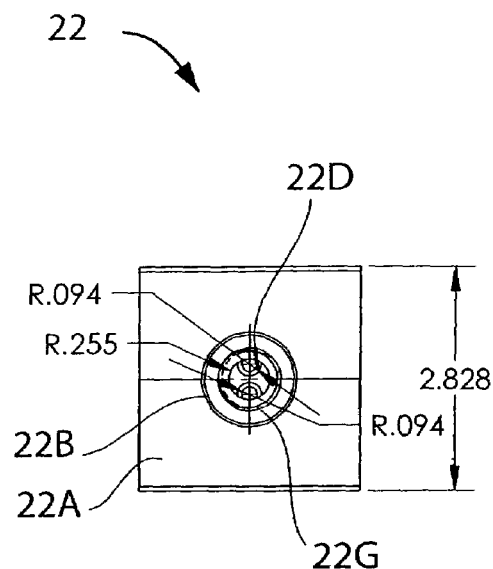
FIG. 15A is a front elevational view of a right angled corner bracket of an embodiment of the present invention.
Figure 15:
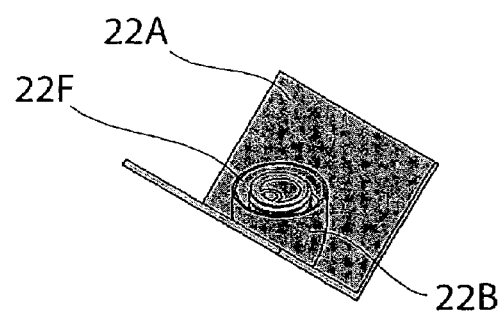
FIG. 15 is a perspective view of a right angled corner bracket of an embodiment of the present invention.
Figure 15B:
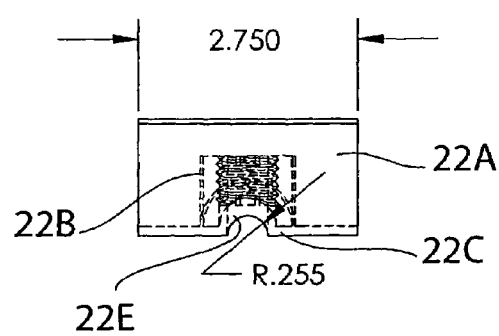
FIG. 15B is a right side elevational view of FIG. 15A.
Figure 15C:
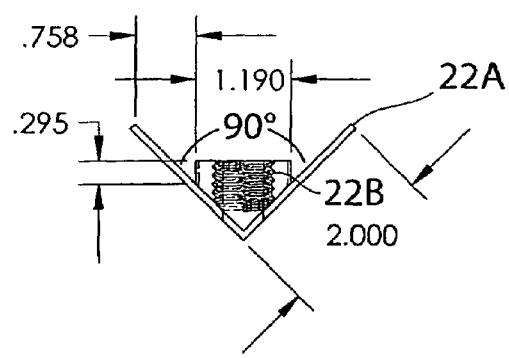
FIG. 15C is a top side elevational view of FIG. 15B.

Implementation of the apparatus, system and method according to the present invention for corners on unfinished interior walls is shown in FIG. 2. First a hole of desired diameter and terminal location is drilled in the corner framing. In FIG. 2, a corner bracket 22 is installed to the corner such that the annular aperture 22E, FIG. 15B, is aligned with the drilled corner hole. Wire, such as Cat 6, is run from the wire channels 22D of the corner bracket 22, FIGS. 2 and 15A, to a clip stick 32 which is then attached to a desired outlet box 501, FIG. 4. The Sheetrock® tool 18 is installed onto the corner bracket threaded male end 22F, FIG. 15. Drywall and texture are added to the corner of the wall interior. The Sheetrock® tool 18 is removed from the corner bracket 22, and the corner trim 24 is installed onto the corner bracket 22. The wall and trim are painted according to the construction specifications.

3. Typical Weatherproof Pre-Wiring

With reference to the drawings, embodiments of the present invention provide a weatherproof flashing stub 26 comprising a plate of predetermined thickness, predetermined geometric shape, and having a top side 26A and a bottom side 26E with central axis. The preferred embodiment stub 26 has a generally square geometry plate base. An annular aperture 26D of predetermined diameter is positioned on the central axis defining an opening through the plate base top side 26A and bottom side 26E. A grommet having a continuous annular aperture comprising an inner surface of even diameter 26G corresponding to the diameter of the annular aperture 26D, a longitudinal centerline, a threaded male open end 26C, and cylindrical flange 26B of predetermined diameter and length attached midway thereto and having an open end such that the flange open end corresponds to the end of the threaded male open end 26C, and terminates in a flush relationship thereto, is provided. The end opposite the open end of the cylindrical flange 26B is affixed to the plate base top side 26A so that the annular aperture 26D is correspondingly aligned with the inner surface 26G. Flange 26B length varies depending upon installation system requirements.

A weatherproof trim 30, having a cylindrical flange 30B defining a longitudinal centerline with an open end of a diameter slightly smaller than the weatherproof flashing stub flange 26B and threaded female opening 30C having threads corresponding to the weatherproof flashing stub threaded male open end 26C is provided within the trim cylindrical flange 30B. The trim 30 further comprises a cap 30A having a circular planar surface of a diameter slightly larger than the cylindrical flange 30B attached to the flange 30B end opposite the open end, and an arcuate surface. The arcuate surface comprises an indentation 30D to facilitate threading the trim 30 onto the flashing stub 26.

An embodiment of the present invention for weatherproof systems provides a gasket 28 comprising a circular, planar body 28A of predetermined diameter defining a central axis with a circular aperture 28B thereon, the aperture 28B having a diameter slightly larger the diameter of the weatherproof flashing stub flange 26B.

Another embodiment of the present invention for weatherproof systems on uneven surfaces, such as lapped siding applications, provides a slope gasket 40 comprising a circular body of predetermined diameter comprising a planar surface 40A and a sloped surface 40C having a predetermined angle of slope from the planar surface 40A. The gasket further comprises a central axis with a circular aperture 40B centered thereon, the aperture 40B having a diameter slightly larger the diameter of the weatherproof flashing stub flange 26B.

The weatherproof flashing stub 26 is affixed to an unfinished wall surface by standard nail or screw attachment means through the attachment holes 26F such that the flange 26B is directed outward towards the wall surface to be finished. Wire is run to the flashing stub flange 26B and into and through the wire channels 26H within the inner surface 26G of the annular aperture 26D. Once the wall is finished around the flange 26B, the weatherproof gasket 28 is placed over the flange 26B and fitted against the finished wall surface. The weatherproof trim 30 is screwed onto the flange threaded male open end 26C until the flat side of the trim cap 30A is snug against the gasket 28. For applications presenting a lapped siding finish with corresponding angled finished surfaces, the weatherproof slope gasket 40 is substituted for the weatherproof gasket 28, wherein the predetermined angle of slope for the weatherproof slope gasket 40 corresponds to the finished surface angle.

Implementation of the apparatus, system and method according to the present invention for unfinished exterior walls is shown in FIG. 3. In FIG. 3, a weatherproof flashing stub 26 is installed to the unfinished exterior surface by standard screws or nails through attachment holes 26F in an actual or potential terminal location. Wire, such as Cat 6, is run from the wire channels 26D of the weatherproof flashing stub 26, FIGS. 3 and 16A, to a clip stick 32 which is then attached to a desired outlet box 501, FIG. 4. Siding is added to the wall exterior. A weatherproof gasket 28 or 40 is installed onto the weatherproof flashing flange 26B, and trim is screwed onto the threaded male open end 26C, FIGS. 3 and 16. The exterior wall and trim are painted according to the construction specifications.

The principal components of the apparatus of the present invention, namely the grommet 16, Sheetrock® tool 18, trim 20, lock nut 12, rafter bracket 14, corner bracket 22, corner trim 24, weatherproof flashing stub 26, weatherproof trim 30, clip stick 32, stud bracket 34, gasket 28, and slope gasket 40, and all sub-component elements thereof, are made of plastics selected in consideration of the intended field of application of the pre-wiring installation and it is significant in this respect whether the component or sub-component elements thereof should be rigid or flexible. It has been found that adequate plastic materials of construction for these components and sub-component elements include, inter alia, poly-vinylchoride, polyethersulfones, and polyetherketones suitable for Cat 5 or Cat 6 wiring. Further, rafter bracket(s) 14 and stud bracket(s) 34 may be made from suitable metals according to construction specifications.

It is further understood that the application of the invention is not restricted to the field which has been explained with reference to the illustrated embodiment. The invention can be applied to advantage not only to pre-wiring low voltage connections, but to connections for fiber optic wiring, and the like. Besides, trim 20 locking mechanism 20C detents [and related locking mechanism 24C detents for the corner trim 24] are not restricted to the preferred embodiment number [two] and spatial orientation [one hundred eighty degree orientation, one to the other], but could number three detents with one hundred twenty degree spatial orientation, one to the other immediately adjacent mechanisms on the same plane perpendicular to the defined central longitudinal axis of the trim, four detents with ninety degree spatial orientation, one to the other immediately adjacent mechanisms on the same plane perpendicular to the defined central longitudinal axis of the trim, or similarly modified detent number and arranged orientation. Other locking mechanisms, such as rings, may be substituted for detents in keeping with the scope of the present invention.

As can be seen from the foregoing, a the present invention can be installed and utilized to quickly provide pre-wire routing for low voltage electrical pathways in a building during construction so that additional outlet boxes, junction boxes, switches, fixtures, and the like may be installed after finishing without compromising the integrity of the exterior surfaces of the walls containing such terminal locations.

For the purposes of promoting an understanding of the principles of the present invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the present invention as illustrated therein being contemplated as would normally occur to one skilled in the art to which the invention relates.

It should be understood that the invention is not intended to be limited by the specifics of the above-described embodiments, but rather by the accompanying claims.

I claim:

1. Apparatus adapted for pre-wiring low voltage wire terminal locations for unfinished surfaces, the apparatus comprising:
   at least one support apparatus suitable to be affixed to an internal support structure and comprising at least one aperture of predetermined diameter;
   at least one wire grommet sized to fit within the support apparatus aperture diameter at an actual or potential terminal location;
   fastening means to secure the wire grommet to the support apparatus, said fastening means comprising a lock nut;
   prophylactic means to protect the wire grommet from surface finishing, said prophylactic means comprising a textured wall tool;
   connecting means to secure a wire connected to the wire grommet to an outlet box, said connecting means comprising a clip stick; and
   at least one trim.

2. The apparatus of claim 1, wherein support apparatus further comprises apparatus selected from the group consisting of stud bracket and rafter bracket, and the support apparatus aperture is annular.

3. The apparatus of claim 2, wherein the wire grommet consists of a grommet comprising a continuous annular aperture defining an inner surface of even diameter, a threaded outer surface, a longitudinal centerline, at least two wire channels in off-set orientation within the grommet inner surface, and a cylindrical flange attached near a centerpoint of the grommet threaded outer surface providing first and second threaded male open ends whereby the flange further comprises an open end corresponding in length to the second threaded male open end and terminating in a flush relationship thereto, and whereby the first threaded male open end diameter is slightly smaller than the diameter of hanger means aperture.

4. The apparatus of claim 3, wherein prophylactic means to protect the grommet from surface finishing comprises said said textured wall tool comprising:
   a ribbed extension comprising a tapered male open end defining an annular aperture, a flange end having a diameter slightly less than the grommet flange, an inner surface of even diameter, and a longitudinal centerline; and
   a female open end within the flange, wherein the female open end is threaded to correspondingly communicate with the grommet second threaded male open end and is flush with the flange end.

5. The apparatus of claim 4, wherein fastening means to secure the grommet to the support apparatus comprises said lock nut with threads suitably adaptable to the grommet first threaded male open end.

6. The apparatus of claim 4, wherein the trim comprises a cylindrical flange defining a longitudinal centerline with an open end of a diameter slightly larger than the grommet flange, locking mechanism within the trim cylindrical flange to detachably connect the trim cylindrical flange disposed in opposition to the grommet flange in pressing engagement with one another, a cap having a first circular planar surface of a diameter slightly larger than the cylindrical flange attached to the trim flange end opposite the trim flange open end and a second arcuate surface, and a prong of predetermined length extending along the longitudinal axis from the cap planar surface beyond the flange open end.

7. The apparatus of claim 1, wherein the support apparatus, wire grommet, and fastening means to secure the wire grommet to the support apparatus are combined and comprise:
   a first bracket of predetermined angle having an annular aperture of predetermined diameter centered on the bracket angle; and
   said grommet having a continuous annular aperture comprising an inner surface of even diameter corresponding to the diameter of the annular aperture, a longitudinal centerline, at least two off-set wire channels within the annular aperture and affixed to the inner surface, a threaded male open end, and cylindrical flange of predetermined diameter and length attached midway thereto and having an open end such that the flange open end corresponds to the end of the threaded male open end and terminates in a flush relationship thereto, whereby the cylindrical flange is affixed to the bracket so that flange length varies depending upon installation system requirements and predetermined bracket member angle.

8. The apparatus of claim 7, wherein the trim comprises:
a second bracket of predetermined angle; and
a cylindrical flange comprising a longitudinal centerline, an open end of a diameter slightly larger than the corner bracket flange, a closed angled end connected to the second bracket, connecting prong of predetermined length extending along the longitudinal axis from the angled second bracket beyond the flange open end, and locking mechanism within the trim flange to detachably connect the trim cylindrical flange disposed in opposition to the grommet flange in pressing engagement with one another.

9. The apparatus of claim 8, wherein prophylactic means to protect the wire grommet from surface finishing comprises textured wall tool comprising:
a ribbed extension comprising a tapered male open end defining an annular aperture, a flange end having a diameter slightly less than the grommet flange, an inner surface of even diameter, and a longitudinal centerline; and
a female open end within the flange, wherein the female open end is threaded to correspondingly communicate with the grommet threaded male open end and is flush with the flange end.

10. The apparatus of claim 8, wherein the predetermined first and second bracket angles are ninety degrees.

11. The apparatus of claim 1, wherein the support apparatus, wire grommet, prophylactic means to protect the wire grommet from surface finishing, and fastening means to secure the wire grommet to the support apparatus comprise:
a plate of predetermined thickness and geometrical shape comprising a top side, a bottom side, a central axis, and an annular aperture of predetermined diameter on the central axis defining an opening through the plate base top side and bottom side;
a grommet having a continuous annular aperture comprising an inner surface of even diameter corresponding to the diameter of the plate annular aperture, a longitudinal centerline, a threaded male open end, and a cylindrical flange of predetermined diameter and length attached midway thereto and having an open end corresponding to the end of the threaded male open end and terminating in a flush relationship thereto, whereby the end opposite the open end of the cylindrical flange is affixed to the plate base top side so that the plate annular aperture is correspondingly aligned with the inner surface.

12. The apparatus of claim 11, wherein the trim comprises:
a cylindrical flange defining a longitudinal centerline and comprising an open end of a diameter slightly smaller than the grommet flange, a threaded female opening having threads corresponding to the grommet threaded male open end within the trim cylindrical flange; and
a cap comprising a circular planar surface of a diameter slightly larger than the cylindrical flange and attached to the flange end opposite the open end, and an arcuate surface.

13. The apparatus of claim 11, further comprising:
a circular, planar gasket of predetermined diameter defining a central axis; and
a circular aperture having a diameter slightly larger the diameter of the grommet flange centered on the planar gasket.

14. The apparatus of claim 11, further comprising:
a circular slope gasket of predetermined diameter defining a planar surface and a sloped surface having a predetermined angle of slope from the planar surface, and a central axis; and
a circular aperture having a diameter slightly larger the diameter of the grommet flange centered on the circular slope gasket.

15. The apparatus of claim 1, wherein connecting means to secure the wire connected to the wire grommet to an outlet box consists of said clip stick comprising:
an arm having two ends;
a oval connecting loop attached to one arm end to receive the wire; and
a clip assembly attached to the other arm end and further comprising a resilient head having an inside surface and an outside surface defining a receiving channel, and a plurality of teeth on the inside head surface facing the receiving channel, whereby once wire from the trim is attached to the loop the resilient head receiving channel can be affixed to an electrical terminal box until the low voltage system is ready to be installed and activated.

16. The apparatus of claim 1, wherein the apparatus comprises materials selected from the group consisting of poly-vinylchoride, polyethersulfones, and polyetherketones.

17. In a building under construction and having partial wall and ceiling portions, including interior and exterior portions, and formed by internal framing elements, a method for pre-wire routing of low voltage wire from actual and potential terminal locations to electrical boxes to provide undetectable terminals on finished interior surfaces and weatherproof terminals on finished exterior walls, the method comprising the steps of:
providing building plans and specifications defining a plurality of actual and potential terminal locations;
providing the apparatus of claim 1;
attaching at least one support bracket to framing elements at each terminal;
installing a wire grommet into the support bracket at each terminal;
securing the wire grommet to the terminal support bracket;
providing an adequate length of low voltage wire having two ends;
attaching one wire end to the wire grommet;
running the other wire end to an electrical box and attaching it to the box using connecting means;
for interior walls, attaching a prophylactic means to the wire grommet;
finishing the wall surface according to the building plans and specifications;
for interior walls, removing the prophylactic means from the wire grommet;
for exterior walls, attaching a gasket;
installing trim to the wire grommet; and
for interior walls, painting the trim and walls.

18. In a building under construction and having partial wall and ceiling portions, including interior and exterior portions, and formed by internal framing elements, a system for pre-wire routing of low voltage wire from actual and potential terminal locations to electrical boxes to provide undetectable terminals on finished interior surfaces and weatherproof terminals on finished exterior walls, the system comprising:
- means for providing building plans and specifications defining a plurality of actual and potential terminal locations;
- means for providing the apparatus of claim 1;
- means for attaching at least one support bracket to framing elements at each terminal;
- means for installing a wire grommet into the support bracket at each terminal;
- means for securing the wire grommet to the terminal support bracket;
- means for providing an adequate length of low voltage wire having two ends;
- means for attaching one wire end to the wire grommet;
- means for running the other wire end to an electrical box and attaching it to the box using connecting means;
- for interior walls, attaching a prophylactic means to the wire grommet;
- means for finishing the wall surface according to the building plans and specifications;
- for interior walls, means for removing the prophylactic means from the wire grommet;
- for exterior walls, means for attaching a gasket;
- means for installing trim to the wire grommet; and
- for interior walls, means for painting the trim and walls.

* * * * *